United States Patent [19]

Taylor

[11] 4,418,408
[45] Nov. 29, 1983

[54] STYLUS ARM FOR VIDEO DISC PLAYER

[75] Inventor: Byron K. Taylor, Carmel, Ind.

[73] Assignee: RCA Corporation, New York, N.Y.

[21] Appl. No.: 328,303

[22] Filed: Dec. 7, 1981

[51] Int. Cl.³ .............................................. G11B 3/44
[52] U.S. Cl. ..................................... 369/170; 29/447
[58] Field of Search ...................... 369/170, 171, 173; 29/447

[56] References Cited

U.S. PATENT DOCUMENTS

| | | | |
|---|---|---|---|
| 3,345,732 | 10/1967 | Brower | 29/447 |
| 4,030,124 | 6/1977 | Allen | 369/219 |
| 4,068,850 | 1/1978 | Smit et al. | 369/171 |
| 4,138,113 | 2/1979 | Sheldon | 29/447 |
| 4,352,176 | 9/1982 | Itoh | 369/170 |

Primary Examiner—Gerald Goldberg
Assistant Examiner—Hezron Williams
Attorney, Agent, or Firm—E. M. Whitacre; J. S. Tripoli; D. A. Kulkarni

[57] ABSTRACT

A stylus arm assembly is formed by heating the stylus to about 250° F., and then inserting it into a section of heat shrink tubing. The subsequent heating of the joint causes the portions of the heat shrink tubing surrounding the stylus to shrink to fixedly hold the stylus in place.

2 Claims, 4 Drawing Figures

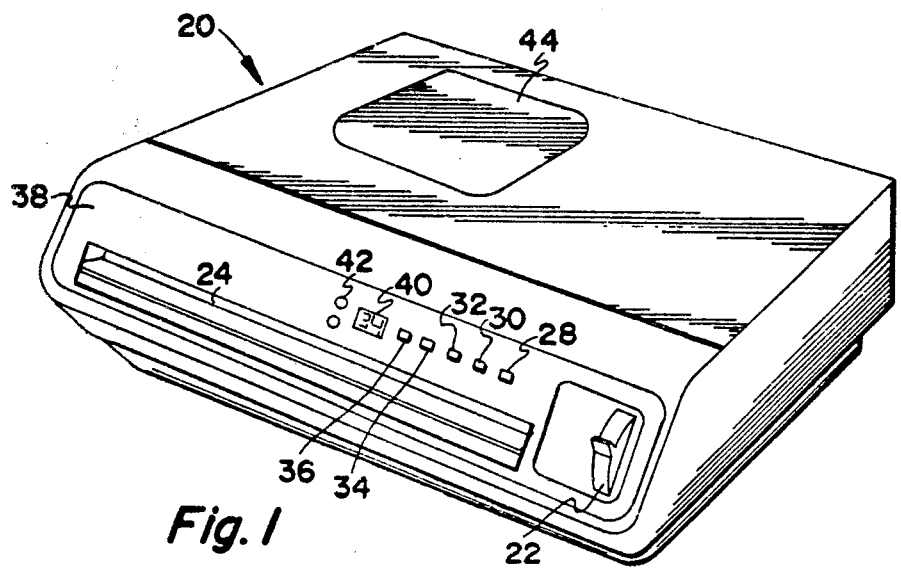
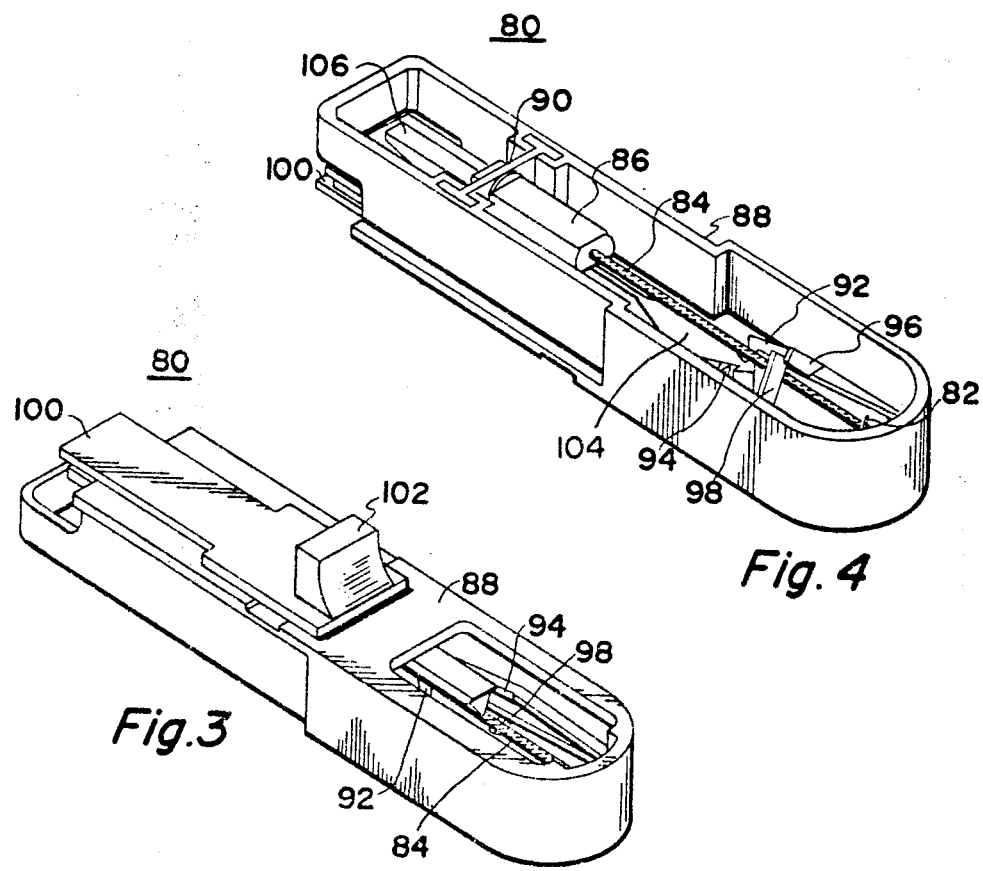
Fig. 1
Fig. 3
Fig. 4

STYLUS ARM FOR VIDEO DISC PLAYER

This invention relates to a video disc player, and more particularly, to a novel stylus arm construction.

In certain systems, picture and sound signals are stored on a video disc in the form of physical undulations in a continuous spiral track disposed on the disc surface. The video disc is placed on a turntable in a video disc player for playback. The variations in electrical capacitance between an electrode disposed on a disc-engaging pickup stylus and a conductive property of the disc are sensed during playback as the physical undulations on the disc surface pass beneath the stylus tip. The capacitive variations are converted into electrical signals for application to a conventional television receiver. A capacitance-type pickup system is illustratively disclosed in U.S. Pat. No. 3,842,194 (Clemens).

Because of the high information storage requirements of a video disc system such as the one disclosed in Clemens, the successive convolutions of the information track or groove are closely spaced (e.g., groove width=2.5 micrometers), and the signal elements are small (e.g., signal element length=0.25 to 0.75 micrometers). The small dimensions of the information track lead to a pickup stylus that has correspondingly small dimensions (e.g., stylus width=2 micrometers). The pickup stylus is typically housed in a cartridge. The pickup cartridge is installed in a translatable carriage disposed in the player. During playback, the carriage is driven radially to follow the motion of the pickup stylus.

Because of the minuteness of the signal elements impressed on video discs, such records are sensitive to contamination. Dust, debris or foreign matter on the record could cause the pickup stylus to lift away from the record during playback, resulting in signal loss, or carrier distress, at the output of the pickup. The video disc is desirably enclosed in a caddy to protect the record from such contamination. A caddy extraction mechanism in the player allows the video disc to be loaded and unloaded without the need for touching the record.

Although the employment of a protective caddy reduces the accumulation of foreign matter on a video disc, the presence of dust and debris on the video disc cannot be entirely avoided. Besides, some contamination is generated as the pickup stylus rides in the record groove during playback. The contamination on the record can cause carrier distress during playback.

A partial alleviation of the carrier distress problem can be achieved by utilizing a preplay stylus having a shoe portion which engages the groove of the information record prior to the actual playback. The preplay stylus scrapes dust and debris particles off the groove walls and thereby effects a cleaning of the groove ahead of the pickup stylus.

In accordance with an invention disclosed in a concurrently-filed, commonly assigned U.S. patent application Ser. No. 328,550, of Straub, entitled "STYLUS CARTRIDGE", a protective cartridge for the preplay stylus is provided. The preplay stylus is disposed at one end of a stylus arm. The other end of the stylus arm is yieldably supported in a cartridge housing. The cartridge housing is provided with a pair of integrally-molded compliant retaining fingers for supporting the stylus arm in a raised position within the confines of the cartridge housing. The cartridge housing is further equipped with a slider member, which spreads the retaining fingers apart to release the stylus arm when acted upon.

Pursuant to the present invention, it is proposed that a section of a heat shrinkable tubing be used as the preplay stylus arm. To secure the preplay stylus to the stylus arm, the tip of the stylus is heated and inserted into the heat shrinkable tubing near one end thereof to form a stylus arm assembly. The hot stylus causes portions of the heat shrinkable tubing surrounding the preplay stylus to shrink to firmly secure the stylus to the stylus arm. The heat shrink tubing is sufficiently compliant to track both the vertical and lateral disc runout.

Although in this particular embodiment of the subject invention, a section of heat shrinkable tubing is used for forming a preplay stylus arm assembly, it is noted that it can also be employed to secure a pickup stylus to a pickup stylus arm.

In the Drawings:

FIG. 1 is a video disc player incorporating the preplay stylus cartridge employing the stylus arm in accordance with the present invention;

FIG. 3 represents a perspective view of the subject preplay stylus cartridge; and FIG. 4 shows an inverted perspective view of the preplay cartridge of FIGS. 1-3.

Figure 2:
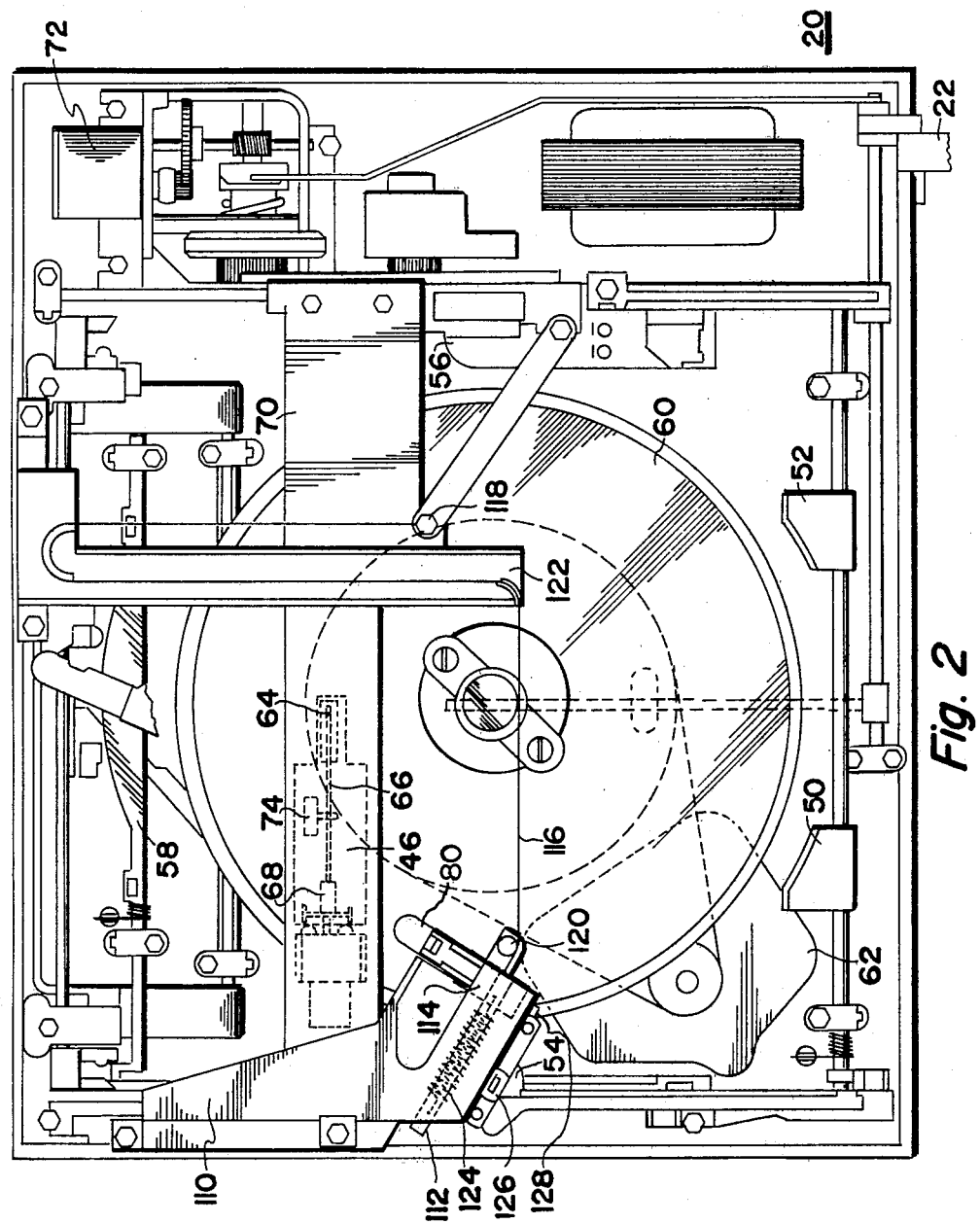
FIG. 2 illustrates a plan view of the video disc player of FIG. 1 with its cover removed to show the underlying details of the preplay cartridge mechanism.

Shown in FIG. 1 is a video disc player 20 employing a stylus arm in accordance with the present invention, and illustrated in the context of a Straub preplay stylus cartridge. A function lever 22 on the front side of the player is subject to disposition in any one of three positions—OFF, PLAY and LOAD/UNLOAD. A caddy entry door closes a caddy input slot 24 when the function lever 22 is disposed in the OFF and PLAY positions. In the LOAD/UNLOAD position of the function lever 22, the caddy entry door is opened to permit insertion of a video disc caddy into the player to load an enclosed record therein. A pushbutton 28 is provided to dispose the player in the "PAUSE" mode to allow the viewer to interrupt the program for as long as desired without missing any of the program content. In the PAUSE mode, the pickup device is raised and its lateral motion is arrested. A set of pushbuttons 30, 32, 34 and 36 are arranged on the instrument panel 38 to dispose the player in any one of four "SEARCH" modes, i.e., rapid access (forward/reverse) and visual search (forward/reverse) to permit the viewer to quickly locate a precise section of the prerecorded program. During rapid access, the pickup device is lifted, and rapidly moved sideways. In visual search, the pickup device is rapidly moved sideways while in engagement with the record. A digital LED readout 40 provides an indication of playing time and other functions, such as PAUSE, LOAD/UNLOAD and END-OF-PLAY, etc. A pair of tally lights 42 are operated to provide an indication of the record side subject to play, e.g., "SIDE 1" and "SIDE 2". A removable door 44 is disposed on the cover of the player to provide access to a pickup cartridge 46, illustrated in FIG. 2, so that it can be changed when required.

The basic operation of the video disc player will now be described in conjunction with FIG. 2. To load a video disc into the player, the player is disposed in the LOAD/UNLOAD mode and a caddy is inserted into the player through the input slot 24. A record extraction mechanism provided in the player retains the record inside the player resting on a set of receiving pads 50, 52, 54, 56 and 58, when the caddy sleeve is withdrawn. The record extraction mechanism is of the type described in U.S. Pat. No. 4,266,784 issued to Torrington. The function lever 22 is shifted to the PLAY position to raise a turntable 60 to pick the record up from the receiving pads 50–58, and to start a turntable drive motor 62.

The pickup cartridge 46 houses a pickup stylus 64 disposed at one end of a pickup stylus arm 66. The pickup stylus arm 66 comprises a section of light-weight aluminum tubing. The other end of the pickup stylus arm 66 is suspended in the pickup cartridge housing by a compliant coupler 68. A typical pickup cartridge is shown in U.S. Pat. No. 4,030,124, issued to Allen. The pickup cartridge 46 is housed in a pickup carriage 70 which is driven by a carriage drive motor 72 from a position at the back of the player toward the record center such that it follows the radially inward motion of the pickup stylus 64. The details of the carriage drive mechanism are given in U.S. patent application, Ser. No. 193,060, filed for O'Connell, now U.S. Pat. No. 4,325,136, et al. A stylus lifter 74, located in the pickup carriage 70, selectively lowers the pickup stylus 64 for record engagement during playback. U.S. Pat. No. 4,266,785, issued to Burrus, illustrates a suitable stylus lifter. The recovered signals at the output of the pickup stylus 64 are transformed by appropriate signal processing circuitry for application to a television receiver.

The retrieval of the record from the player is basically the reverse of the loading sequence. An empty sleeve is reinserted into the player to capture the record, and then extracted from the player to retrieve it. The front edge of the sleeve engages the pickup carriage 70 to drive it back to its starting position when the empty sleeve is reinserted into the player for record retrieval.

As previously indicated, it is advantageous to employ a preplay stylus to clean the dust and debris off the groove walls ahead of the pickup stylus, thereby reducing the possibility of carrier distress. A preplay stylus cartridge 80 will now be described in reference to FIGS. 3 and 4. The preplay stylus 82 is disposed at one end of a stylus arm 84. The preplay stylus arm 84, in accordance with this invention, comprises a section of a heat shrinkable tube. To secure the preplay stylus 82 to the stylus arm 84, the tip of the stylus is heated and inserted into the heat shrinkable tubing. The heated stylus heats the tubing and causes the region surrounding the preplay stylus 82 to shrink to fixedly hold the stylus. The other end of the stylus arm 84 is secured to a coupler 86. The coupler 86 is suspended in the cartridge housing 88 by means of a rubber diaphragm 90. The cartridge housing 88 is provided with a pair of integrally-molded flexural retaining fingers 92 and 94. The preplay cartridge housing 88 can be molded from any suitable plastic (e.g., Noryl). Disposed on the retaining fingers 92 and 94 are respective depending hook portions 96 and 98. The depending portions 96 and 98 support the stylus arm 84 within the body of the cartridge housing 88.

The cartridge housing 88 is fitted with a pair of guide rails which are received in the respective channels provided in a slider member 100 in a manner allowing to-and-fro motion of the slider. The slider 100 is equipped with a handle 102. Disposed on the underside of the slider 100 is a wedge-shaped cam portion 104 which serves to spread the retaining fingers 92 and 94 apart to free the stylus arm 84 when the slider is advanced. The coupler 86 provides the appropriate tracking force to the preplay stylus 82 when it engages the record.

Disposed at the back of the coupler 86 is an extension 106 which is acted upon by the slider 100 when it is retracted to cause the stylus arm 84 to withdraw within the confines of the cartridge housing 88. The retraction of the slider 100 permits the retaining fingers 92 and 94 to close, whereby the stylus arm 84 is held in place in a raised position.

The preplay cartridge drive mechanism will now be explained in conjunction with FIG. 2. A bracket 110, fixedly mounted to the player, is fitted with a guide rod 112 for slidably supporting a trolley 114, which, in turn, houses the preplay cartridge assembly 80. A cable 116 has its one end secured to the trolley 114, and its other end is attached to an anchor 118 disposed on the pickup carriage 70. The cable 116 is guided along a path defined by a guide roller 120 and a guide member 122. As the carriage drive motor 72 drives the pickup carriage 70 during playback from a position at the rear of the player toward the front of the player, the cable 116 pulls the preplay cartridge trolley 114 from a position near the record periphery toward the record center. The preplay stylus 82 travels radially inward and ahead of the pickup stylus 64. As previously mentioned, the preplay stylus 82 cleans the grooves ahead of the pickup stylus 64 to reduce the possibility of loss of signal. A spring 124 serves to reset the trolley 114 to its starting position when the pickup carriage 70 is returned to the back of the player.

Mounted to the bracket 110 behind the trolley 114 is a stylus lifter 126 of the type earlier mentioned (U.S. Pat. No. 4,266,785). The stylus lifter 126 acts on a pivotally mounted frame 118, which, in turn, operates on the extension 106 secured to the stylus arm 84 at the back end thereof to selectively raise and lower the preplay stylus 82. The preplay stylus lifter mechanism is normally biased to dispose the preplay stylus 82 in the raised position. The preplay stylus 82 is lowered for record engagement when the preplay stylus lifter 126 is activated. The preplay stylus 82 is thus protected in the event of a power failure.

To form a preplay stylus arm assembly, the tip of a preplay stylus (illustrative dimensions: tip width—2 micrometers, tip depth—4 micrometers, shank diameter—0.010 inches, and shank length—0.060 inches) is heated to about 250° F., and then inserted and oriented into a section of a heat shrinkable tube (typical dimensions: length—1.75 inches, inside diameter—0.024 inches and wall thickness—0.0015 inches), such that a desired relationship is obtained between the two. The heated stylus pierces a hole in the stylus arm tube when it is inserted. Any suitable technique, such as—induction heating, focussed radiant energy heating, solder iron heating, etc., may be used for heating the stylus. The heat shrinkable tube is of the type available from Niemand Industries, New York. The heated stylus heats the tubing and causes the regions surrounding the preplay stylus to shrink in order to firmly secure the stylus to the stylus arm. The heat shrinkable tube starts shrinking when the temperature reaches approximately 175° F. The heat shrinkable tube finally shrinks to about 35 to 50 percent of its original diameter when heated to approximately 250° F. The joint between the stylus and stylus arm is capable of withstanding a pull force greater than 50 grams. The spring rate of the stylus arm is about 340 dynes per centimeter. The stylus arm compliance is sufficient to allow the stylus to track runout, warp, etc., during playback.

Alternatively, a stylus may be inserted and oriented into a hole disposed at one end of a heat shrinkable tube. The portions of the heat shrinkable tube surrounding the stylus may then be heat shrunk onto the stylus to firmly secure the stylus in place.

As mentioned above, a section of heat shrinkable tubing is used in this particular embodiment of the instant invention to form a preplay stylus arm assembly. It can be seen, however, that the heat shrink concept of securing a stylus to its stylus arm is applicable to forming a pickup arm assembly, or to joining the other end of the stylus arm to its support.

What is claimed is:

1. A method of forming a stylus arm assembly comprising the steps of:
    (A) heating a stylus;
    (B) inserting said stylus into a section of heat shrinkable material at one end thereof to form said stylus arm assembly; and
    (C) heat shrinking said material to fixedly secure said stylus to said section.
2. The method as defined in claim 1 wherein said stylus is heated to 250° F.

* * * * *